United States Patent [19]

Gryzlak

[11] Patent Number: 5,353,741
[45] Date of Patent: Oct. 11, 1994

[54] BIRD BATH ASSEMBLY

[75] Inventor: Joseph M. Gryzlak, West Dundee, Ill.

[73] Assignee: Gris Pottery, Carpentersville, Ill.

[21] Appl. No.: 55,145

[22] Filed: Apr. 29, 1993

[51] Int. Cl.$^5$ ............................................. A01K 7/00
[52] U.S. Cl. .................................................. 119/695
[58] Field of Search ............... 119/69.5, 61, 60, 57.8, 119/74; D30/121, 123, 129, 130, 131, 132, 133

[56] References Cited

U.S. PATENT DOCUMENTS

| | | | |
|---|---|---|---|
| 459,032 | 9/1891 | Worthley | 119/61 |
| 1,112,971 | 10/1914 | Bower | 119/61 |
| 2,963,003 | 12/1960 | Oberg et al. | 119/166 |
| 3,205,861 | 9/1965 | Moore | 119/61 |
| 3,683,861 | 8/1972 | Bauspies | 119/61 |
| 3,841,268 | 10/1974 | Buneer | 119/61 X |
| 4,836,141 | 6/1989 | Whitfield | 119/170 X |

Primary Examiner—Thomas Price
Attorney, Agent, or Firm—Trexler, Bushnell, Giangiorgi & Blackstone, Ltd.

[57] ABSTRACT

A bird bath assembly adapted to mount on an existing structure such as a deck or patio. The bird bath assembly includes a gasket member which is placed between the deck structure and a shallow dish-like liquid container of the assembly, and a screw and washer assembly for securely and rigidly fastening the container to the existing structure. Once installed, the gasket member functions to remove irregularities present in the surfaces of both the existing deck structure and the container and thereby makes a wide variety of container designs, constructed from clay or other like materials, available for mounting in an effective and attractive manner.

13 Claims, 1 Drawing Sheet

5,353,741

BIRD BATH ASSEMBLY

BACKGROUND OF THE INVENTION a. Field of the Invention

The present invention relates generally to deck and patio ornamentation and, in particular, to a unique bird bath assembly for providing access to a supply of fresh water for birds and animals.

b. Description of Related Prior Art

More frequently than ever, new home designs include an outdoor deck or patio structure as part of the basic plans. Outdoor decks and patios are also being added to existing homes in record numbers.

As part of the enjoyment of an outdoor deck or patio, many home owners take pleasure in bird watching and, in order to attract them, include a bird bath as part of the deck or patio decor.

At present, bird baths are available in a variety of designs and styles from the traditional pedestal-mounted ornamental vessel, to the more-modern designs incorporated into larger structures, or adapted to mount directly thereon. The materials used to construct bird baths are also come in a wide variety including cement, plastic and ceramic.

One of the most desirable appearances results by forming the bird bath from clay. Most clay-formed articles, however, are inherently non-uniform in shape and, consequently, can be very difficult to join with an existing structure in a workable and attractive manner. This is especially true when a clay bird bath is intended for mounting on a wooden deck structure where both the deck structure and the bird bath are likely to include uneven mating surfaces. An unattractive coupling with visible gaps is likely to result. This problem also limits the shapes and designs of bird baths which can be adapted for installation on existing structures such as wooden decks and the like.

OBJECTS AND SUMMARY OF THE INVENTION

It is a principal objective of the present invention to provide a bird bath assembly adapted for mounting on an existing structure in an effective and attractive manner.

It is a related objective to provide a bird bath assembly which, upon installation, removes the effects of any surface irregularities present in the assembly and/or the surface to which it is mounted.

Another objective is to provide a bird bath assembly which can be designed in a variety of geometric shapes to mount on a variety of existing structures in an effective and attractive manner.

Other objects and advantages of the invention will become apparent upon reading the following detailed description and upon reference to the drawings- Throughout the description, like reference numerals refer to like parts.

In accordance with the foregoing objects, and briefly stated, the present invention comprises a bird bath assembly adapted for mounting on a structural element for containing and presenting liquid to birds and animals and includes a dish-like container having a substantially open top to provide a relatively large area of access to the retained liquid, a fastener for mounting the dish-like container to the structural element in a secure and rigid manner along a substantially smooth, continuous, exterior mounting surface of the dish-like container, and a resilient gasket member placed between the mounting surface of the dish-like container and a mating surface of the structural element, the gasket member functioning to remove the effects of any irregularities present in the mounting surface of the dish-like container and in the mating surface of the structural element, thereby providing the appearance of a smooth and uniform connection.

BRIEF DESCRIPTION OF THE DRAWINGS

The features of the present invention which are believed to be novel are set forth with the particularity in the appended claims. The organization and manner of operation of the invention, together with further objects and advantages thereof, may best be understood by reference to the following descriptions taken in connection with the accompanying drawings, in which:

DETAILED DESCRIPTION OF THE PREFERRED EMBODIMENTS

While the invention will be described in connection with preferred embodiments thereof, it will be understood that it is not intended to limit the invention to those embodiments. On the contrary, it is intended to cover all alternatives, modifications and equivalents as may be included within the spirit and scope of the invention.

Figure 1:
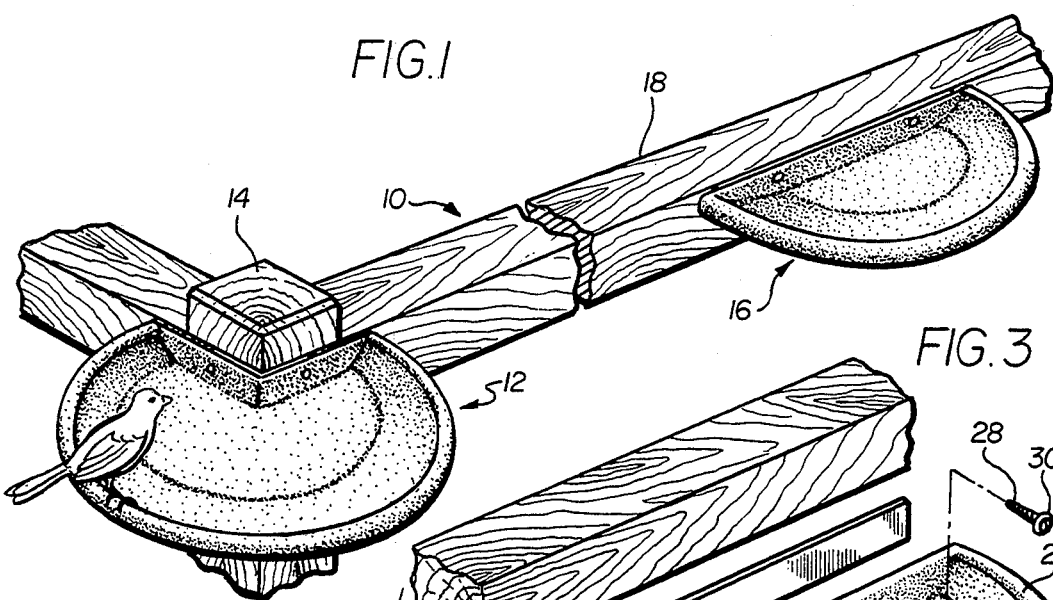
FIG. 1 includes perspective views of two varieties of the present invention mounted on an existing structural element.

Turning now to FIG. 1, there are illustrated two varieties of the present invention, each mounted to an existing structure 10, such as a wooden deck or the like. A first embodiment of the present invention comprises an outside corner-mounted bird bath assembly 12 secured in a rigid manner to a post member 14 of the deck 10. A second embodiment of the present invention comprises a straight line-mounted bird bath assembly 16 similarly secured in a rigid manner to a rail member 18 of the deck 10.

Figure 3:
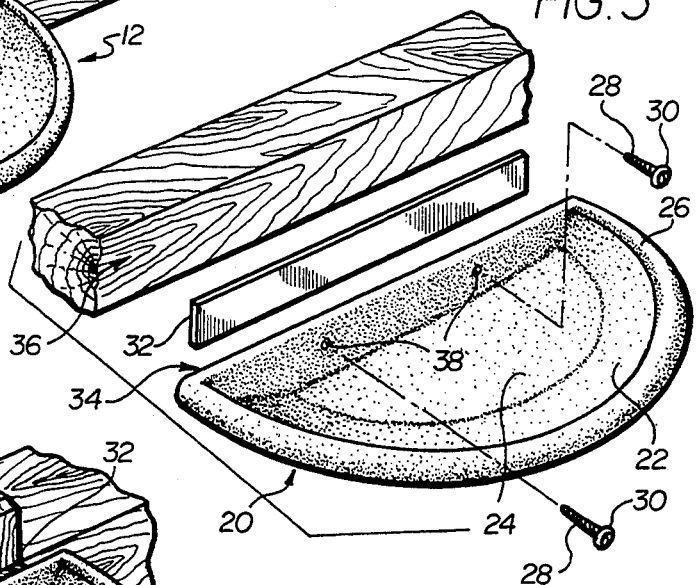
FIG. 3 illustrates an isolated, closeup, exploded view of the other variety of the present invention illustrated in FIG. 1.
Figure 2:
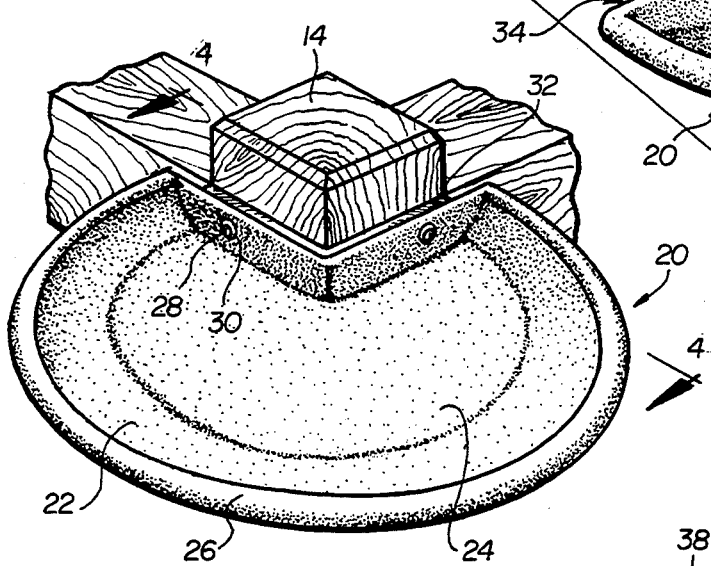
FIG. 2 is an isolated, closeup, perspective view of one variety of the present invention illustrated in FIG. 1.

As best illustrated in FIGS. 2 and 3, each bird bath assembly 12 and 16 includes a shallow dish-like container 20 having a continuous, upstanding side wall 22 extending between a bottom surface 24 and a rim member 26. Also shown to be included in the bird bath assemblies 12 and 16 are screws 28, having washers 30, and a resilient gasket 32, each of which are used for installation of the bird bath assemblies 12 and 16, as will be discussed in greater detail below. Preferably, the dish-like container 20 is made from clay, the screws 28 are wood and the washer 30 and gasket 32 are made of plastic, as will also be discussed in more detail below.

As should be readily apparent to someone of ordinary skill in the art, the deck structure 10 and its illustrated post 14 and rail 18 components typically have rough, non-uniform exterior surfaces which are sometimes cut and assembled at the point of construction of the deck 10. Furthermore, the assembly of such a deck 10 is normally accomplished without concern for a high degree of precision, and thereby results in intersections between the component members, such as between corner post 14 and rail member 18, which do not form predictable, uniform angles.

As should also be common knowledge to one of ordinary skill in the art of ceramic manufacturing processes, clay bird bath assemblies 12 and 16 of the type disclosed will typically be made by a slip-casting process. During the slip-casting process, a mixture of clay and water (typically 60% water) is poured into a two-piece plaster mold of the dish-like container 20 design. As the water is absorbed by the porous mold, clay builds up on the walls of the mold and, after further drying, eventually begins to pull away from the mold, taking the form thereof.

The container 20 is next removed from the mold and, during a finishing process, any seam lines left behind are rubbed out, and a glaze is applied to the interior surface. The container is next fired in a kiln at approximately 2000° for fusion and/or reaction of the components and for attainment of the desired properties. Although this process results in a fine quality, natural looking ceramic art work, the exterior surfaces of the container 20 produced are not perfectly uniform and smooth. Consequently, attachment of the container 20 to a deck 10, similarly having non-uniform, irregular surfaces, may not result in a satisfactory appearance.

To alleviate this concern, the container 20 is next fitted with a gasket member 32 which adheres to the container 20 at a mounting surface 34 formed along a substantially flat, continuous exterior surface of the upstanding sidewall 22. Preferably, the gasket 32 is made of a resilient vitrile-vinyl/neoprene combination with a pressure sensitive adhesive backing, such as is available, for example, from Duraco, Inc. The gasket member 32 further functions to maintain the position of the container 20 once installed, as discussed below, relative to the deck 10, which might otherwise change over time.

Figure 4:
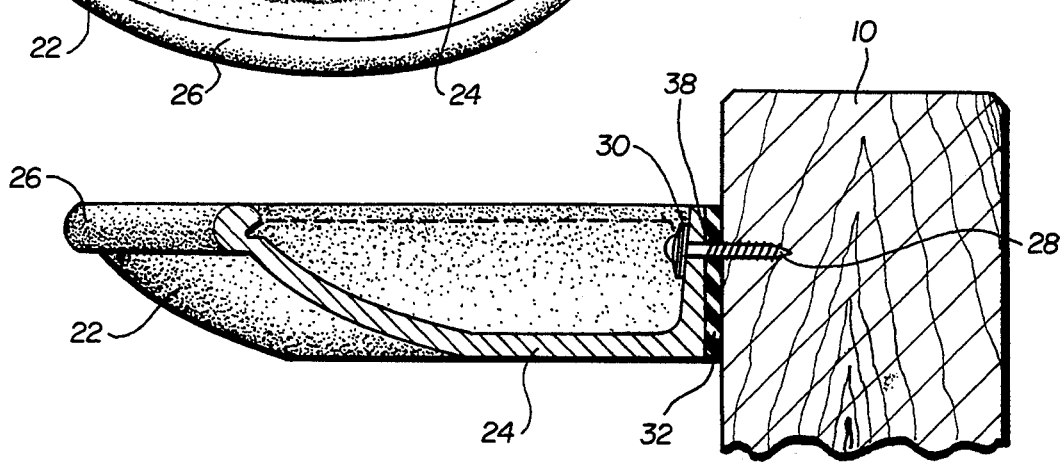
FIG. 4 is a sectional view of the present invention taken along line 4—4 of FIG. 2.

Installation of the container 20 is accomplished, for example, by securing fasteners 28, fitted with washers 30, to a mating surface 36 of the deck 10 through apertures 38 drilled in the mounting surface 34. The apertures 38 are preferably formed during the finishing process discussed above, and the washers 30 should be made from neoprene, or some other material which will seal the aperture 38 and prevent water from penetrating when the liquid level is above the fastener 28 as illustrated by the dashed-line in FIG. 4.

It should also be noted that securing the container 20 to the mating surface 36 of the deck 10 by using screws 28 and washers 30 allows the gasket member 32 to be compressed sufficiently to create a secondary seal for the apertures 38, and also to prevent water, or other liquids, from seeping between the mating surface 36 and the mounting surface 34 of the container 20. However, it is not the Applicant's intent to limit the scope of the means used for connecting the container 20 to the deck 10 to that described. Any method of attaching the remainder of the bird bath assemblies 12 and 16 to the deck 10 which achieves the results discussed will suffice.

Installed as described, it can be easily understood that the gasket 32 functions to remove the effects of any irregularities in the mating surfaces 36 of the deck 10 and/or the mounting surfaces 34 of the dish-like containers 20 thereby resulting in an effective and attractive combination. Not only does the invention described enable more-conventional designs for containers 20 (such as that shown in the straight line-mounted assembly 16), to be mounted effectively and attractively, but it also makes a wide variety of other shapes and designs available for use. The design illustrated by the outside corner-mounted assembly 12, is one example thereof. Again, however, it is not intended to limit the scope of the invention to the designs described.

The invention is claimed as follows:

1. A bird bath assembly adapted to mount on a deck rail corner formed at an angular intersection two substantially planar deck rail surfaces, said bird bath assembly comprising: a shallow container for receiving and retaining liquid and other substances having an open top, an irregular continuous wall member and an integral bottom; an exterior portion of said continuous wall member of said shallow container form in a mountain surface having an angle therein which is substantially equal to an angle formed at the angular intersection forming said deck rail corner; said mounting surface comprising an upstanding wall portion having a length and width; means for fastening said shallow container to said deck rail corner, and; a gasket means located between said deck rail corner and said mounting surface; said gasket means extending along substantially the entire length and width of said upstanding wall portion, a portion of said gasket means being exposed, said gasket means eliminating the effects of surface imperfections existing on either the deck rail corner or the shallow container mounting surface to give the appearance of a uniform connection between the bird bath and the deck rail corner.

2. A bird bath as recited in claim 1, wherein said means for fastening said shallow container to said deck rail corner comprises a screw member located in an aperture formed in said mounting surface below a maximum liquid level line existing on the interior of said shallow container.

3. A bird bath as recited in claim 2, wherein said means for fastening further includes a washer surrounding sad screw member for sealing said aperture to prevent liquid penetration through said aperture in said mounting surface.

4. A bird bath as recited in claim 3, wherein said gasket means is compressed to form a secondary seal to prevent liquid penetration through said aperture and between said deck rail corner and said shallow container.

5. A bird bath as recited in claim 1, wherein said irregular continuous wall member further includes an integral rim formed at an upper most section thereof for providing a surface for birds and animals to perch, and for preventing liquid retained in said shallow member from spilling over said continuous wall member.

6. A bird bath assembly adapted for mounting on a structural element for containing and presenting liquid or seed to birds and animals comprising:
   a. a dish-like container having a substantially open top to provide a relatively large area of access to the retained liquid or seed:
   b. a fastener for mounting the dish-like container to the structural element in a secure and rigid manner along a continuous, exterior mounting surface of the dish-like container, said mounting surface comprising an upstanding wall portion having a length and width and;
   c. a resilient gasket member placed between the mounting surface of the dish-like container and a mating surface of the structural element, said gasket member being visible and extending along substantially the entire length and width of said upstanding wall, said gasket member functioning to remove the effects of any irregularities present in the mounting surface of the dish-like container and in the mating surface of the structural element and thereby providing the appearance of a smooth and uniform connection of the bird bath.

7. A bird bath assembly as recited in claim 6, wherein said fastener comprises at least one screw member extending from an interior surface of said shallow container, through an aperture formed therein and into said structural element.

8. A bird bath assembly as recited in claim 7, wherein a washer is provided between said screw member and said aperture to seal said shallow container and insure liquid retention in said shallow container.

9. A bird bath assembly as recited in claim 8, wherein said gasket member is placed under a sufficient compressive force by said fastener to enable said gasket member to act as a secondary seal for said shallow container and further prevent liquid from passing between said structural element and said mounting surface of said shallow container.

10. A bird bath assembly as recited in claim 6, wherein said mounting surface of said shallow container and said mating surface of said structural element are both continuous, substantially planer right-angled surfaces extending parallel to each other.

11. A bird bath assembly as recited in claim 6, wherein said shallow container further includes a continuous rim extending substantially around said open top, said rim being of greater thickness than an integral container wall extending downward therefrom, providing a perching surface and minimizing accidental liquid overflow from the shallow container.

12. An assembly for retaining liquid or feed and for presenting said liquid or feed for consumption by birds and animals, said assembly being adapted to mount to an outside corner formed at an angular intersection between two substantially planar surfaces of an existing structure, said assembly comprising a dish-shaped container having an interior surface for retention of said liquid or feed and an exterior surface including an mating section that interrupts the dish-shape of said container and is structured to conform with the outside corner of the existing structure, and means for rigidly coupling said mating section of said container with said mounting surface on said existing structure.

13. In combination, a bird bath assembly and corner of an existing structure formed at an angular intersection between two substantially planar surfaces; said bird bath comprising a shallow container for receiving and retaining liquid and other substances having an open top, an irregular continuous wall member and an integral bottom; an exterior portion of said continuous wall member of said shallow container forming a mounting surface having an angle therein which is substantially equal to an angle formed at the angular intersection forming said corner; means for fastening said shallow container to said corner, and; a gasket means located between said corner and said mounting surface; said gasket means being visible and eliminating the effects of surface imperfections existing on either the corner or the shallow container mounting surface to give the appearance of a uniform connection between the bird bath and the corner.

* * * * *

UNITED STATES PATENT AND TRADEMARK OFFICE
CERTIFICATE OF CORRECTION

PATENT NO. : 5,353,741
DATED : October 11, 1994
INVENTOR(S) : Joseph M. Gryzlak

It is certified that error appears in the above-indentified patent and that said Letters Patent is hereby corrected as shown below:

Column 4, Line 10 "intersection two" should be ---intersection between two ---

Column 4, Line 16 "form in a mountain" should be ---forming a mountain---

Column 4, Line 40 "sad" should be ---said---

Column 6, line 10, "an" should be ---a--- (second occurrence)

Signed and Sealed this

Thirty-first Day of January, 1995

Attest:

BRUCE LEHMAN

*Attesting Officer*  *Commissioner of Patents and Trademarks*